(12) United States Patent
Vandor

(10) Patent No.: US 9,316,098 B2
(45) Date of Patent: *Apr. 19, 2016

(54) NON-HYDRAULIC FRACTURING AND COLD FOAM PROPPANT DELIVERY SYSTEMS, METHODS, AND PROCESSES

(71) Applicant: Expansion Energy, LLC, Tarrytown, NY (US)

(72) Inventor: David Vandor, Tarrytown, NY (US)

(73) Assignee: Expansion Energy LLC, Tarrytown, NY (US)

( * ) Notice: Subject to any disclaimer, the term of this patent is extended or adjusted under 35 U.S.C. 154(b) by 369 days.

This patent is subject to a terminal disclaimer.

(21) Appl. No.: 13/858,780

(22) Filed: Apr. 8, 2013

(65) Prior Publication Data

US 2013/0220605 A1    Aug. 29, 2013

Related U.S. Application Data

(63) Continuation-in-part of application No. 13/692,610, filed on Dec. 3, 2012, now abandoned, which is a continuation of application No. 13/358,820, filed on Jan. 26, 2012, now Pat. No. 8,342,246.

(51) Int. Cl.
*E21B 43/267* (2006.01)
*C09K 8/62* (2006.01)
(Continued)

(52) U.S. Cl.
CPC ............... *E21B 43/267* (2013.01); *C09K 8/62* (2013.01); *C09K 8/703* (2013.01); *C09K 8/80* (2013.01)

(58) Field of Classification Search
USPC ............. 166/307.8, 303, 280.1, 272.2, 308.2, 166/302, 75.1, 177.5, 308.4
See application file for complete search history.

(56) References Cited

U.S. PATENT DOCUMENTS 3,358,763 A    12/1967   Petty et al.
3,589,137 A     6/1971   Hoffman
(Continued)

FOREIGN PATENT DOCUMENTS

WO    WO2007/098606       9/2007
WO    WO 2012/097426 A1   7/2012

OTHER PUBLICATIONS

International Search Report and Written Opinion mailed Oct. 3, 2014 in International Application No. PCT/US2014/031679.

(Continued)

*Primary Examiner* — Taras P Bemko
(74) *Attorney, Agent, or Firm* — Eric L. Lane; Green Patent Law

(57) ABSTRACT

Methods and systems of fracturing subterranean formations are provided comprising pumping metacritical phase natural gas into a subterranean formation to create or extend one or more fissures in the formation. Methods and systems may further comprise maintaining or increasing pressure of the metacritical phase natural gas in the formation by pumping more metacritical phase natural gas into the fissures to hold the fissures open. Methods and systems may further comprise delivering a proppant into the subterranean formation. Disclosed methods and systems may be used to extract hydrocarbons from subterranean formations without the use of liquids. Methods and systems of delivering proppant comprise providing a non-aqueous liquid, adding a surfactant to the non-aqueous liquid, adding a proppant to the non-aqueous liquid to form a non-aqueous liquid, surfactant and proppant stream, pumping to pressure the non-aqueous liquid, surfactant and proppant stream, using pressurized natural gas to energize the non-aqueous liquid, surfactant and proppant stream, and delivering the energized non-aqueous liquid, surfactant and proppant stream into a subterranean formation. Methods of recovering proppant delivery liquid are also provided.

21 Claims, 4 Drawing Sheets

(51) Int. Cl.
*C09K 8/80* (2006.01)
*C09K 8/70* (2006.01)

(56) References Cited

U.S. PATENT DOCUMENTS

| | | | |
|---|---|---|---|
| 3,602,310 | A | 8/1971 | Halbert |
| 3,822,747 | A | 7/1974 | Maguire, Jr. |
| 3,948,325 | A | 4/1976 | Winston et al. |
| 4,156,464 | A | 5/1979 | Hussin |
| 4,627,495 | A * | 12/1986 | Harris et al. ............... 166/280.1 |
| 5,653,287 | A | 8/1997 | Wilson et al. |
| 5,883,053 | A | 3/1999 | Tudor |
| 6,237,364 | B1 | 5/2001 | Stone |
| 6,302,209 | B1 | 10/2001 | Thompson, Sr. et al. |
| 6,439,310 | B1 | 8/2002 | Scott, III et al. |
| 7,464,557 | B2 | 12/2008 | Vandor et al. |
| 7,730,951 | B2 | 6/2010 | Surjaatmadja et al. |
| 8,020,406 | B2 | 9/2011 | Vandor et al. |
| 8,342,246 | B2 | 1/2013 | Vandor |
| 2006/0065400 | A1 | 3/2006 | Smith |
| 2006/0243441 | A1 | 11/2006 | Cornelius de Grood et al. |
| 2006/0254287 | A1 | 11/2006 | Greenberg et al. |
| 2007/0123429 | A1* | 5/2007 | Chatterji et al. ............... 507/129 |
| 2007/0125537 | A1* | 6/2007 | Lokhandwala et al. ...... 166/291 |
| 2007/0144736 | A1 | 6/2007 | Shinbach et al. |
| 2007/0215345 | A1 | 9/2007 | Lafferty et al. |
| 2007/0293404 | A1* | 12/2007 | Hutchins et al. ............... 507/211 |
| 2008/0290719 | A1 | 11/2008 | Kaminsky et al. |
| 2009/0113928 | A1 | 5/2009 | Vandor et al. |
| 2010/0051272 | A1 | 3/2010 | Loree et al. |
| 2012/0036888 | A1 | 2/2012 | Vandor |
| 2012/0118566 | A1 | 5/2012 | Vandor |
| 2013/0220605 | A1 | 8/2013 | Vandor |
| 2013/0341010 | A1 | 12/2013 | Nevison |
| 2014/0000899 | A1 | 1/2014 | Nevison |
| 2014/0008074 | A1 | 1/2014 | Nevison |

OTHER PUBLICATIONS

International Search Report and Written Opinion from International Patent Application No. PCT/US2013/022884.
Geocomp Consulting, "Feasibility Study for the Storage of Cold Compressed Natural Gas (CCNG) in Underground Solution-Mined Bedded Salt Caverns in Southwest NY", New York State Energy Research and Development Authority (NYSERDA), Geotechnical Aspects, Sep. 1, 2004.
Bob Downing, "Gas well in Suffield fractured with carbon dioxide foam, minimal water", Beacon Journal, http://www.ohio.com/news/local-news/gas-well-in-suffield-fractured-with carbon-dioxide . . . , Mar. 19, 2013.
International Preliminary Report on Patentability issued Jul. 29, 2014 in International Application No. PCT/US2013/022884.
Examination Report issued Jun. 19, 2014 in Pakistani Application No. 41/2013.

\* cited by examiner

NON-HYDRAULIC FRACTURING AND COLD FOAM PROPPANT DELIVERY SYSTEMS, METHODS, AND PROCESSES

CROSS-REFERENCE TO RELATED APPLICATION

This application is a continuation-in-part of and claims priority to U.S. application Ser. No. 13/692,610, filed Dec. 3, 2012, which is a continuation of and claims priority to U.S. application Ser. No. 13/358,820, filed Jan. 26, 2012, now U.S. Pat. No. 8,342,246, each of which is hereby incorporated by reference in its entirety.

FIELD

The present disclosure relates to non-hydraulic fracturing and cold foam proppant delivery systems and methods for increasing the permeability of underground hydrocarbon formations, thereby increasing the ability to extract such hydrocarbons.

BACKGROUND

Hydrocarbon assets, such as oil and natural gas ("NG"), are often found underground in "tight" geological formations, such as sandstone or shale. These require "unconventional" drilling and completion techniques, including the "fracturing" (or "fracking") of the geological strata that contain the hydrocarbons to allow those hydrocarbons to be released for recovery, treatment, storage and distribution. Existing fracturing methods are hydraulic, i.e., they use liquids for fracturing and for delivering proppant to the fractures.

However, hydraulic fracturing and proppant delivery methods suffer from a number of significant disadvantages. The liquids that are presently used in standard hydraulic fracturing—for example, chemically modified or treated water at ambient temperatures, and/or cryogenic liquid nitrogen—result in waste streams of contaminated liquid water or gaseous methane containing nitrogen. More particularly, using water or nitrogen results in contamination (or undesirable blending) of both the fracking fluids and the hydrocarbons, and using nitrogen or liquid carbon dioxide requires foaming agents.

The waste streams and contaminated mixtures need to be treated, and the cost of fully cleaning and properly disposing of the "spent" hydraulic fracturing fluid substantially increases the cost of hydraulic fracturing—both in economic terms and environmental terms. If that clean-up is not properly accomplished, the damage of hydraulic fracturing on the environment may be adverse, causing regulators and/or policy-makers to limit the use of hydraulic fracturing in response to concerns by the public at large, as is already the case in some regions today. Hydraulic fracturing also often results in significant methane emissions (with methane being a much more environmentally damaging greenhouse gas than $CO_2$) and may require complex apparatus for mitigating such emissions.

Furthermore, some existing hydraulic fracturing technologies are energy- and capital-intensive. For example, use of liquid nitrogen requires the installation of a plant for air separation that uses deep refrigeration to liquefy ambient air, which is then broken down to yield nitrogen. Using nitrogen for fracking generally requires substantial energy input to achieve the liquid states of the nitrogen. Also, when nitrogen (or more precisely, liquid nitrogen) is pumped to high pressures, as required for the fracturing of deeper formations, a phase shift occurs that shifts the $N_2$ from its liquid foam to its gaseous state, and the delivery of proppant under those conditions becomes problematic.

Proppant often is delivered into fractured subterranean formations by foams because they tend to have lower rates of "leak off" than delivery by liquids, that is, reduced loss of fracking fluid from the fracturing. Most existing proppant delivery utilizes liquid $CO_2$ or liquid nitrogen. However, there are several drawbacks to those techniques such as the transportation costs and logistical complexity of importing the liquid $CO_2$ or liquid nitrogen to the well site, contamination of the hydrocarbons by the liquid $CO_2$ or liquid nitrogen, and the need for water as the liquid base for the foam. The use of water as the liquid base for the foam that is energized by the pumped-to-pressure vaporized $CO_2$ or $N_2$, and which foam delivers the proppant, requires many of the same chemicals (cross linkers, slickening agents, anti-swelling compounds . . . ) as standard hydraulic fracturing.

Accordingly, there is a need for an effective fracturing method that does not use liquids. There is also a need for a more energy-efficient fracturing process. There is a further need for a fracturing method that does not create contaminated waste streams requiring difficult clean-up measures. There is also a further need for a fracturing method that increases the recovery of hydrocarbons from underground formations by avoiding the use of water (which hydrocarbons do not interact well with).

There is also a need for foam-based proppant delivery systems and methods that do not require liquid $CO_2$, liquid nitrogen, or extensive volumes of water. Thus, there is a need for non-hydraulic fracturing and proppant delivery systems and methods which are less energy-intensive, do not require liquids for fracking and proppant delivery, do not significantly add contamination or waste to the fracking process, and have the potential to increase hydrocarbon recovery.

SUMMARY

The embodiments of the present disclosure alleviate to a great extent the disadvantages of known fracturing and proppant delivery processes by providing non-hydraulic fracturing and proppant delivery systems, methods and processes using metacritical phase natural gas (which may be referred to hereinafter as "meta-NG") as a fracturing and proppant transport medium. The metacritical phase of a gas is that set of conditions where the gas is above its critical pressure and is colder than its critical temperature. The meta-NG, which is pumped to a high pressure, is used to create or extend fissures in subterranean formations and hold those fissures open to release hydrocarbons contained in those formations. The meta-NG may be pumped to a high pressure, warmed and used to deliver suitable proppant to the fissures in the subterranean formations.

Embodiments of the present disclosure provide systems and methods of energized gas fracking by delivering proppant using foam wherein the liquid is a non-aqueous fluid that may also include a surfactant and to which proppant is added, which fluid is energized into a foam by meta-NG, and recovering the liquids that result from the collapsed foam, which liquids return to the surface with the released hydrocarbons. Disclosed systems and methods of proppant delivery may use meta-NG pumped to pressure at the well, where the meta-NG is produced at the well or nearby, and where the feed NG is not significantly different from the NG that is about to be liberated. A non-aqueous liquid, such as one of many alcohols, including but not limited to ethanol, methanol, or glycol, is used as the pumped-to-pressure liquid that is energized, or foamed, in some embodiments together with a surfactant, by the high-pressure meta-NG or compressed natural gas (CNG).

Use of a non-aqueous liquid, such as one of many alcohols, including but not limited to ethanol, methanol, or glycol, as the pumped-to-pressure liquid that (together with a surfactant) is energized (foamed) by the high-pressure meta-NG. The choice of meta-NG versus compressed natural gas ("CNG") for foaming will depend on the desire to produce foam that is more viscous with the colder meta-NG or less viscous with CNG. Foam viscosity is one of many factors that well-completion experts control in order to achieve deep proppant delivery inside the fracture. Higher viscosity helps create wider fractures and helps carry the proppant deeper inside the fractures. Additional factors that may determine if a particular well completion effort would use meta-NG or CNG may include the temperature tolerance of the well casing and the foam delivery piping/tubing.

Exemplary embodiments include a method of fracturing subterranean formations, comprising pumping meta-NG into a subterranean formation to create or extend one or more fissures in the formation. The meta-NG may be produced on site. Methods may further comprise maintaining or increasing pressure of the meta-NG in the formation by pumping more meta-NG into the fissures to hold the fissures open. In exemplary embodiments, a proppant is delivered into the subterranean formation by the meta-NG. The proppant may be lubricated and delivered via warm compressed natural gas ("CNG") at a high pressure or by foam at various pressures and temperatures.

In exemplary embodiments, the high-pressure warm CNG is produced by pumping to pressure and warming the meta-NG. Exemplary methods may further comprise releasing the pressure of the CNG such that the proppant alone holds the fissures open. In exemplary embodiments, the fissures are created and held open without use of water or other liquids, and the proppant is delivered without water or other liquids. Moreover, the fracturing and proppant delivery steps may be performed without chemical additives for mitigating adverse effects of liquid use.

Exemplary embodiments of a non-hydraulic fracturing process comprise pumping meta-NG into a subterranean formation to create or extend one or more fissures in the formation and delivering a proppant into the subterranean formation. The process may further comprise maintaining or increasing pressure of the meta-NG to hold the fissures open. In exemplary embodiments, the proppant is lubricated, and the proppant may be delivered via warm CNG produced by pumping to pressure and warming the meta-NG. By using exemplary embodiments of disclosed processes, the fissures are created and held open without use of water or other liquids and the proppant is delivered without water or other liquids.

Exemplary embodiments of a non-hydraulic fracturing system comprise a meta-NG supply, a cryogenic storage tank for storing the metacritical natural gas, at least one positive displacement device (e.g., a pump or compressor), and a network of pipes (which piping may include well casing and/or cement). The cryogenic storage tank is fluidly connected to the meta-NG supply, and the positive displacement device is fluidly connected to the cryogenic storage tank. The network of pipes is fluidly connected to the at least one positive displacement device and the cryogenic storage tank, and at least one pipe extends into a subterranean formation. In exemplary embodiments, the meta-NG is supplied by an on-site natural gas plant configured to convert natural gas into meta-NG by an appropriate balance of compression and refrigeration. As discussed throughout this disclosure, the meta-NG can be produced from CNG returning from the subterranean formation to an aboveground NG plant.

Exemplary systems are arranged so the meta-NG flows through the network of pipes into the subterranean formation such that the meta-NG creates or extends one or more fissures in the formation. The at least one positive displacement device increases the pressure of the meta-NG to hold the fissures open. The systems may further comprise a proppant housed in a storage vessel, hoppers, and/or other devices that allow the proppant to enter the meta-NG so the meta-NG can deliver proppant to the fissures in the subterranean formation. In exemplary embodiments, warm high-pressure CNG flows through the network of pipes and the proppant is delivered into the fissures of the subterranean formation via the warm high-pressure CNG.

Exemplary embodiments also include methods of delivering a proppant via cold foam, comprising providing a non-aqueous liquid, adding a surfactant to the non-aqueous liquid, adding a proppant to the non-aqueous liquid to form a non-aqueous liquid, surfactant and proppant stream, pumping to pressure the non-aqueous liquid, surfactant and proppant stream, using pressurized natural gas to energize the non-aqueous liquid, surfactant and proppant stream, and delivering the energized non-aqueous liquid, surfactant and proppant stream into a subterranean formation. The pressurized natural gas may be metacritical phase natural gas, or meta-NG. The proppant holds open one or more fissures in the subterranean formation.

In exemplary embodiments, the energized non-aqueous liquid, surfactant and proppant stream is at a temperature between ambient temperature and about −140° F. The non-aqueous liquid may be methanol, and the methanol, surfactant and proppant stream enters a foam state when it is energized by the high pressure NG. In this context, the term "energize" refers to the introduction of a high-pressure gas stream into a liquid stream that contains (among other things) a surfactant, such that foam is produced. In exemplary embodiments, the foam state of the methanol breaks in the subterranean formation such that the methanol becomes liquid or vapor. The liquid or vapor methanol may then dissolve in a hydrocarbon liberated from the subterranean formation forming a methanol-hydrocarbon solution, and the methanol-hydrocarbon solution then travels out of the subterranean formation. Exemplary embodiments further comprise recovering the methanol by directing metacritical phase natural gas in a first direction and directing the methanol-hydrocarbon solution in a second direction substantially opposite to the first direction. In such embodiments, the metacritical phase natural gas cools the methanol-hydrocarbon solution and the methanol in the methanol-hydrocarbon solution condenses out of solution.

Exemplary embodiments include methods of recovering proppant delivery liquid. Such methods comprise first recovering a solution of proppant delivery liquid dissolved in a hydrocarbon liberated from a subterranean formation when the solution travels out of the subterranean formation. Then the metacritical phase natural gas is directed in a first direction and the proppant delivery liquid-hydrocarbon solution is directed in a second direction substantially opposite to the first direction. In such embodiments, the metacritical phase natural gas cools the proppant delivery liquid-hydrocarbon solution and the proppant delivery liquid in the proppant delivery liquid-hydrocarbon solution condenses out of solution. The proppant delivery liquid may be an alcohol and may be methanol in exemplary embodiments. In exemplary embodiments, the metacritical phase natural gas is produced on site.

An exemplary embodiment of a proppant delivery system comprises a proppant supply, a surfactant supply fluidly connected to the proppant supply, a non-aqueous liquid supply fluidly connected to the proppant supply and the surfactant supply, a foaming vessel fluidly connected to the proppant supply, the surfactant supply and the non-aqueous liquid supply, a natural gas supply fluidly connected to the foaming vessel, at least one positive displacement device fluidly connected to the foaming vessel, and a network of pipes fluidly connected to the at least one positive displacement device with at least one pipe extending into a subterranean formation.

In exemplary embodiments, a proppant from the proppant supply and a surfactant from the surfactant supply are added to non-aqueous liquid from the non-aqueous liquid supply to form a non-aqueous liquid, surfactant and proppant stream. The at least one positive displacement device may pump to pressure the non-aqueous liquid and proppant stream. The pressurized natural gas then foams the non-aqueous liquid, surfactant and proppant stream. In exemplary embodiments, the energized non-aqueous liquid, surfactant and proppant stream flows through the network of pipes into the subterranean formation such that the energized non-aqueous liquid, surfactant and proppant stream holds open one or more fissures in the subterranean formation. In exemplary embodiments, the non-aqueous liquid is methanol.

Accordingly, it is seen that non-hydraulic fracturing systems, methods, and processes are provided. The disclosed non-hydraulic fracturing systems and methods do not require liquids for fracking and proppant delivery because they use metacritical phase natural gas for fracking the subterranean formation and CNG produced from the metacritical phase natural gas as the proppant delivery medium. The disclosed systems and methods do not add (or result in) contamination or waste to the fracking process and are less energy-intensive. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1:
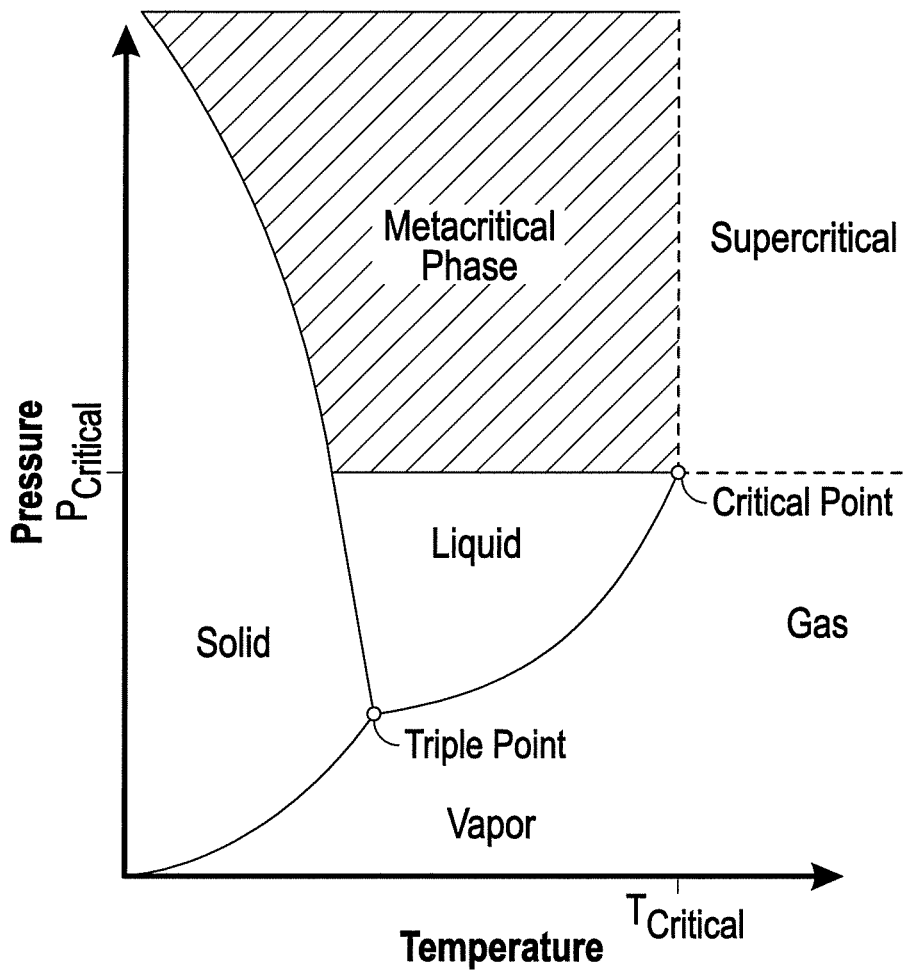
FIG. 1 is a phase diagram of methane, which is an analog for the phase diagram of natural gas.

In general, embodiments of the present disclosure's systems and methods—called Vandor's Refrigerated Gas Extraction ("VRGE")—use cryogenic non-liquid, metacritical phase natural gas for non-hydraulic fracturing and/or as a delivery medium for proppant in the non-hydraulic fracturing process. Meta-NG, which is also sometimes referred to as "cold compressed natural gas" or "pumped liquid natural gas," is natural gas in the metacritical phase. As shown in FIG. 1, the metacritical phase of a fluid is found on a phase diagram above the fluid's critical pressure, colder than the fluid's critical temperature, but not within the solid phase. That metacritical phase is above the liquid phase, to the left of the supercritical phase and to the right of the solid phase on FIG. 1. As such, metacritical phase fluids are not true liquids, but will behave much like liquids, most importantly in that they can be pumped to a higher pressure by liquid pumps, including reciprocating pumps, and other such positive displacement devices. The density of metacritical phase fluids can be nearly as dense (and sometimes even more dense) than the density of the liquid phase of the fluid. Metacritical phase fluids do not "boil" because they are above the liquid phase, and they do not need to be "condensed" in order to allow for pumping, because they are dense enough (even as a non-liquid) to be "viewed" as liquids by pumps.

As an overview, embodiments of disclosed non-hydraulic fracturing systems and methods send pumped-to-pressure cryogenic meta-NG down through a network of pipes into a subterranean formation to create or extend fissures in the formation. The meta-NG is produced at the well site from nearby pipeline gas, or from a nearby (previously completed) natural gas well, rather than being imported to the site as liquefied natural gas ("LNG") or liquefied petroleum gas ("LPG"). Meta-NG can be pumped to any required pressure by various known pumping devices, delivering a high-enough fluid pressure and "thermal shock" to the subterranean formation so as to fracture the formation.

When the formation "yields" (or fractures), as indicated by pressure monitoring equipment aboveground, pressure is increased by the aboveground pumps, so as to keep the fissures open, and is followed by the insertion and delivery of the proppant by warm CNG. That delivery is possible because the meta-NG can be pumped to a high pressure and then warmed to produce a high-pressure CNG stream, which will carry the proppant into the fissures formed or extended by previously sent-down meta-NG. The ideal proppant would be selected by on-site experts familiar with local conditions and the array of available proppants, including sand or man-made proppants such as ceramic balls. The proppant may be lubricated, facilitating its transit through the piping, and avoiding scouring of the piping.

The lubricated proppant is delivered by warm, high-pressure CNG, rather than by meta-NG. After delivery of the proppant, the pressure can be released, slightly relaxing the formation, but the fissures would be kept open by the proppant, allowing the natural gas previously sent down, and the natural gas within the formation to blend and rise as one stream to the surface. During the early stages of the fracking process, including before proppant delivery, such returning NG would be re-compressed and re-chilled to form more meta-NG, and then re-circulated to advance the fracking process. Thus, the NG that is used to produce the meta-NG will be a mixture of the previously sent down meta-NG and any NG released by the fractured formation.

The different NG streams in disclosed embodiments, which vary in phase, temperature, pressure, and function, are enumerated as follows. Meta-NG is referred to herein by number 50a; warm, high-pressure CNG is referred to herein by number 50b; CNG-proppant stream is referred to herein by number 50c. These three streams, at different times and for different purposes as described in detail herein, are sent down into the subterranean formation. Return flow CNG stream, which returns to the surface from the subterranean formation, is referred to herein by number 52.

Figure 2:
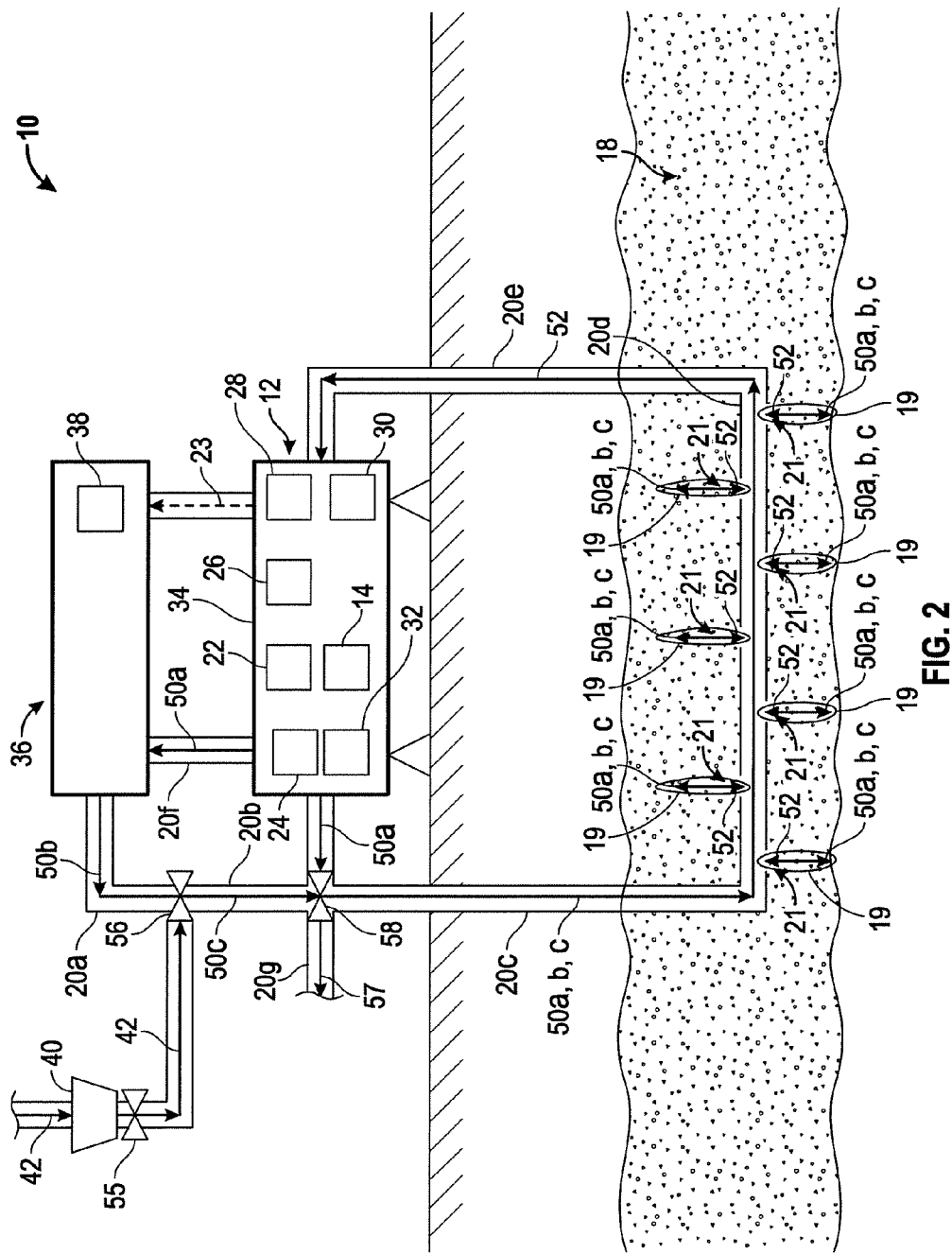
FIG. 2 is a box diagram of an embodiment of a non-hydraulic fracturing system in accordance with the present disclosure.

Turning to FIG. 2, an exemplary embodiment of a non-hydraulic fracturing system will be described. Non-hydraulic fracturing system 10 comprises a sub-system 12 supplying meta-NG, a cryogenic storage tank 14 for storing the meta-NG, and a network of pipes 20a-20g connecting the aboveground equipment to the subterranean formation 18. The meta-NG supply equipment 12 includes an array of production equipment, which may comprise different combinations of components such as a prime mover 22, which can be any suitable engine, a compressor 24, a chiller 26, a gas dryer 28, one or more meta-NG heat exchangers 30, and a cryogenic pump 32, and any other components, including but not limited to valves, sensors, and expanders, which together make up a natural gas plant 34 that can produce dense-phase meta-NG. At least one positive displacement device is included in the equipment as well, i.e., the compressor 24 and the cryogenic pump 32 serves as the positive displacement device to move the meta-NG through the pipes 20b-20c into a subterranean formation 18. It should be noted, however, that the positive displacement device could be any device that causes a fluid to move, trapping a fixed amount of it then forcing, i.e., displacing, that trapped volume into a discharge pipe, including but not limited to, positive displacement pumps, such as reciprocating pumps, or compressors configured to perform "pump" work, such as screw compressors.

The cryogenic storage tank 14 is fluidly connected via one or more pipes or other conduits to the meta-NG supply equipment 12 so the produced meta-NG can be stored for use. In turn, one or more of the positive displacement devices (i.e., the compressor 24 and the cryogenic pump 32) are fluidly connected to the cryogenic storage tank 14 and the meta-NG supply equipment 12. Finally, the network of pipes 20a-20f is in fluid connection with the positive displacement devices (i.e., the compressor 24 and the cryogenic pump 32) so they can effectively "pump" the meta-NG into the pipes. Although multiple configurations are possible, in an exemplary embodiment, positive displacement devices (compressor 24 and cryogenic pump 32) are connected to pipe 20b and/or pipe 20c.

The meta-NG supply equipment 12 can be deployed as a single unit above a subterranean formation holding natural gas (and/or oil or condensates), with the well immediately adjacent to natural gas plant 34 delivering meta-NG, and/or with another well some distance away acting as the "methane extraction vent" where any warmed NG would return to the surface. That second well would be connected back to the first well and to the meta-NG supply equipment 12 by surface (or near surface) NG piping, completing a "loop." That loop, which would contain several pressure-release valves, would allow for pressure build up in the subterranean formation, and would allow for rapid pressure letdown by way of the integrated valves. Such rapid pressure letdown would result in cooling of the methane within the subterranean fissures served by the "loop" and would act to create dynamic stressing of the formation due to the fluctuating pressure and the rapid cooling of the NG within the system, which would potentially release more hydrocarbons from the formation.

A variation could have two (or more) meta-NG supply equipment 12 deployments some distance apart, connected to the wide network of subterranean piping with one or more surface-mounted piping connections between meta-NG supply equipment 12 deployments, allowing for a flexible regime of meta-NG injection from and warm CNG injections from several directions in a manner that would enhance the thermal shocking of the underground formation, and would offer several "paths of least resistance" for the liberated methane to rise to the surface.

At least some of the underground piping may have perforations 21 in the horizontal pipes that allow the meta-NG 50a to enter the fissures 19 in the subterranean formation 18. As discussed in more detail below, a two-pipe design may be provided including a first pipe and its surrounding annulus as well as a pair of pipes separated by some distance. The pair of pipes can be connected at the surface, to each other, and with the meta-NG supply equipment 12 at that connecting point.

The piping below ground, and within the hydrocarbon-bearing formation, is shown, where pipe 20c is the vertical piping that delivers the meta-NG 50a for fracking, and later the CNG-proppant stream 50c. The perforated horizontal piping system 20d is shown (not in scale) at some depth below the surface. The vertical meta-NG piping may be supplemented by vertical riser pipe 20e, which allows for the meta-NG 50a (and later, liberated gas, vaporized methane, and/or the recovered hydrocarbons) to travel back to the surface, as discussed in more detail herein, without warming up the cryogenic piping, and allowing cryogenic methane to flow down while warmer, vaporized methane flows up. For the sake of clarity, it is shown some distance from pipe 20b, at a remote end of pipe 20d. If that were the deployed configuration, the aboveground portion of pipe 20e would return to the meta-NG supply equipment 12.

Exemplary embodiments may employ a two-pipe design, shown in FIG. 2. In this configuration, the downward flow of meta-NG 50a can occur at the same time as the return flow of warmed CNG 52, allowing for the rapid cool-down of the subterranean formation 18 that is being fractured. Exemplary embodiments of two-pipe designs include a first aboveground length of piping (here, pipes 20a and 20b), as well as a pair of subterranean vertical pipes 20c, 20e separated by some distance, where pipes 20c and perforated pipe 20d act as the meta-NG 50a and proppant 42 delivery system and pipe 20e (located, e.g., about 200-500 feet away) is in "communication" with the same formation and serves as the "riser" that allows the returning meta-NG (as warm return flow CNG 52) plus any NG liberated from the formation to rise to the surface. Pipes 20e and 20a can be connected at the surface, to each other, and with the meta-NG supply equipment 12 at that connecting point, thus allowing the return from pipe 20e to be re-cooled and pressurized for renewed send-down. In exemplary embodiments, pipe 20e is fluidly connected to the meta-NG supply equipment 12, which is fluidly connected to pipe 20b.

However, pipe 20e may well be located in the same well bore as pipe 20c. More likely, in order to avoid excessive costs, pipe 20e may be an annulus around pipe 20c. In other words, an arrangement of concentric pipes could be used in which the different forms of NG described herein could be sent down in different concentric pipes and/or the NG could return to the surface in a different concentric pipe than the NG being sent down to the subterranean formation. Those with expertise in natural gas recovery systems can make various decisions as to how to organize the vertical piping that links to the horizontal piping.

Exemplary embodiments further comprise a CNG system 36 for use in the proppant delivery process. CNG system 36 includes different combinations of components such as a CNG heat exchanger 38 to warm the highly pressurized meta-NG 50$a$ into high-pressure CNG 50$b$, as well as valves and program logic controls. As discussed in more detail herein, the heat source for warming the pumped-to-pressure meta-NG into CNG can be waste heat 23 from the prime mover 22. If more heat is needed than can be recovered from the waste stream of the prime mover, then a gas-fired heater (not shown) may be used to supplement the available waste heat. A proppant hopper 40 is also provided, which is fluidly connected to the CNG system 36 to dispense proppant 42 into the high pressure CNG stream 50$b$ exiting the CNG system 36. Although depicted in FIG. 2 as separate boxes for the sake of clarity, all of the aboveground equipment, including the meta-NG supply equipment 12 and the CNG system 36, may be installed as a single process without distinction between the meta-NG and the CNG production. It should be noted that FIG. 2 illustrates one possible set of relationships between the aboveground equipment and the below-ground vertical and horizontal piping. Those of skill in the art will likely find several other arrangements, which are contemplated by the present disclosure.

In operation, a preliminary step of producing the meta-NG is performed by the meta-NG supply equipment 12, and could be accomplished by any known methods or systems for compressing and chilling NG such that it is converted to meta-NG 50$a$. Processes for producing meta-NG comprise applying the appropriate temperature and pressure to NG, and those pressure and temperature parameters are described in more detail herein. One significant advantage of disclosed embodiments is that the fracturing medium can be produced at the site of the subterranean formation being exploited. More particularly, the meta-NG 50$a$ can be produced at the well site from nearby pipeline gas or from a nearby natural gas well (which may be "stranded" or may be connected to a pipeline), rather than being imported to the site as LNG or LPG. Both the feed gas for fueling the prime mover 22 and the feed gas to be compressed and chilled to meta-NG would be obtained from a nearby NG well, a nearby completed oil well producing "associated gas," a nearby pipeline, a single batch of LNG delivered to the site, or some combination of NG sources. However, after the initial start-up, much of the meta-NG 50$a$ sent down into the subterranean formation 18 is produced from the targeted subterranean formation or recycled from the CNG returning to the surface via pipe 20$e$, obviating the need for further delivery of NG or LNG from off-site, and obviating the need for large on-site storage vessels. For many deployments, available nearby NG sources will obviate the need for any "importing" of LNG.

In exemplary embodiments, the meta-NG 50$a$ used for fracking is produced by the meta-NG supply equipment 12 and stored in a cryogenic, moderate-pressure (e.g., approximately 700-800 psia) storage tank 14. The stored meta-NG is pumped to pressure with a cryogenic liquid pump 32, or equivalent positive displacement device. This pressure would be in the range of about 4,000-12,000 psia for many subterranean formations, but could be greater than that if the formation is very deep. As is understood in the art of fracking, deeper formations require higher pressure. When high-pressure CNG is sent down, for purposes of thermal shocking and/or proppant delivery, the high-pressure (slightly warmed by the heat of pumping) meta-NG 50$a$ is heat exchanged with ambient temperature, low-pressure feed gas with the meta-NG supply equipment 12, cooling that feed gas and warming the outbound high-pressure meta-NG to, e.g., 30° F. CNG. That cooling of the feed gas to the meta-NG supply helps reduce the work required to produce more meta-NG 50$a$. It should be noted that the meta-NG supply equipment 12 offers the flexibility to produce meta-NG at any temperature, e.g., colder than about −150° F., at a pressure of 700 psia (or greater) allowing that non-liquid, metacritical phase of natural gas to be pumped to any desired pressure (e.g., up to about 12,000 psia) with cryogenic liquid pumps or equivalent positive displacement devices. That method avoids the need to use compressors to bring the cold methane up to the high pressure.

The meta-NG 50$a$ exits meta-NG supply equipment 12 and is pumped to pressure by one or more of the positive displacement devices. For instance, cryogenic pump 32 could pump the meta-NG 50$a$ to sufficient pressure for send-down in the pipes 20$b$-20$d$, which would typically be greater than about 2,000 psia. More particularly, the "loop" of fracking gas in pipes 20$a$-20$f$ can be varied as to the temperature and pressure of the downward flowing meta-NG 50$a$ and as to the duration of that flow. With the meta-NG supply equipment 12 and positive displacement device producing an appropriate flow rate, the meta-NG 50$a$ flows downward into the ground and toward the subterranean formation 18 via vertical pipe 20$c$.

In an exemplary embodiment, the pumped-to-pressure meta-NG would be sent down to the geological formation at 2,800 psia or greater pressure at a temperature range of approximately between −170° F. to −220° F. and may lose a significant amount of pressure within the geological formation, falling to approximately 500 psia but forming some LNG within the fissures in the formation at conditions between approximately 500 psia at −158° F. and 285 psia at −197° F. In another exemplary embodiment, the pumped-to-pressure meta-NG would be sent down to the geological formation at 2,800 psia or greater pressure and within a range of −160° F. to −200° F., and would lose only a portion of its pressure within the geological formation, falling to 700 psia or greater pressure and warming somewhat, having given up a portion of its refrigeration content to the "thermal shocking" of the geological formation.

When the meta-NG 50$a$ enters pipe 20$c$ via valve 58 and flows from above to below ground, it causes the geology that surrounds the vertical pipe(s) to freeze in a radial pattern, thereby providing a frozen zone of insulation. For this reason, it is not necessary to insulate the vertical pipes. Once in the subterranean formation 18, the meta-NG 50$a$ exits pipe 20$d$ through perforations shown approximately as 21 and delivers high pressure and thermal shock to the formation 18. When the formation 18 fractures to create or extend fissures due to the pressure and shock, the positive displacement device above ground then increases the pressure on the meta-NG flow to the pressure required for that formation's fissures to remain open, ready to accept the proppant. As mentioned above, pressures in the range of about 4,000-12,000 psia are typical, but the pressure will vary based on the formation and the depth of the hydrocarbon bearing rock, with very deep formations requiring higher pressures. In order to maintain the high pressures that are built up during the fracking process, control valves including on pipe 20$e$ would be set to "plug" such pipe and not allow pressure reduction by way of escaping NG. As will be clear to experts in fracturing techniques, the pressure build-up can be achieved in stages, including by isolating portions of the well bore.

At this point, proppant 42 is delivered to the fissures 19 in the subterranean formation 18. Any suitable proppant could be used, including but not limited to, sand, ceramics, fly ash, or other such hard and smooth materials that may be selected in the future. Man-made ceramic balls at various small scales provide a uniform, relatively hard and smooth proppant. Moreover, ceramic balls tend not to clump together and block fissures and will not absorb lubricant added to the proppant stream.

While sand is the standard proppant material used in water-based (or $N_2$-based) hydraulic fracturing to keep the expanded fissures from re-collapsing and closing, other grainy materials, such as fly ash may not be suitable for water delivery (i.e., standard hydraulic fracturing) because the combination of fly ash and water would cause a cement-like compound that would restrict the NG flow rate. It should be noted, however, that disclosed embodiments, which use no water, do not have that limitation. Thus, exemplary embodiments may use sand, and other small-scale, uniformly shaped, hard particles that "flow" when delivered in a lubricated manner, as proppants, which are substantially non-aqeuous through an appropriately designed blower that is integrated down-stream of the CNG equipment 36. In exemplary embodiments, the proppant 42 is lubricated by any suitable non-toxic and low-cost natural or synthetic fluid, including but not limited to vegetable oils or biodiesel. The lubricant serves to move the proppant 42 smoothly, with low friction, through the piping and into the underground formation.

The lubricated proppant 42 is delivered by warm, high-pressure CNG 50b. The high-pressure is achieved by the pumping of meta-NG. More particularly, the CNG would be produced by pumping the meta-NG 50a to a high pressure, sending it through pipe 20f to a heat exchanger 38 in the CNG system 36 for warming via heat exchange with the NG stream, thus cooling the feed gas, and where the waste heat 23 from the prime mover 22 would substantially warm the NG, shifting it from a metacritical phase to a supercritical state, ultimately warming the meta-NG to CNG. The high-pressure CNG stream 50b exits the CNG system 36, and proppant hopper 40 dispenses proppant 42 in a controlled manner, through valves 55 and 56, into the high-pressure CNG stream 50b. Proppant 42 meets the high-pressure CNG stream 50b in pipe 20a. The warm, high-pressure CNG 50b will carry the lubricated proppant 42 much like air carries sand in a sand storm, but without the scouring effect of "sand blasting."

The CNG-proppant stream 50c then flows downward through pipes 20b and 20c and travels through pipe 20d, exiting through perforations 21 to flow deep into each of the smallest fissures that have resulted from the fracturing process. It should be noted that, because of the delivery by warm high-pressure CNG, the lubricant (and the proppant) do not need to tolerate deeply chilled delivery conditions, and therefore the lubricant and proppant do not need to be completely non-aqueous. Also, advantageously, the delivery (by CNG) of warm proppant to the fissures of the subterranean formation does not cause the formation of ice crystals or frozen "clumps" of lubricated proppant. However, the high-pressure CNG 50b can be cold enough to also deliver frozen pellets of acetylene, which upon warming will produce localized explosions in the subterranean, hydrocarbon-bearing formation. Such a step may be used to enhance the fracking process prior to proppant send down.

After delivery of the proppant 42, the pressure on the CNG-proppant stream 50c can be released, slightly relaxing the subterranean formation 18. However, the fissures 19 in the formation 18 are held open by the proppant 42, allowing the natural gas previously sent down, and the natural gas within the formation to blend and rise as one stream to the surface via pipe 20e. It should be noted that the protocols for optimal fracturing, proppant delivery and NG recovery steps may vary depending on the application, and including such factors as the depth of the formation, the length of the horizontal piping in the formation, the targeted hydrocarbon(s), and the geology of the formation.

During the fracking process, the meta-NG 50a is warmed by the ambient heat of the subterranean formation 18 and then travels up pipe 20e or the annular space surrounding the pipe, returning to the surface as warmed return flow CNG 52 still somewhat pressurized. The returning (upward flowing), warmed return flow CNG stream 52, which will eventually consist almost entirely of NG released from the geological formation, will initially be warm when it arrives at the surface, but will get cooler and cooler over time as a result of the meta-NG supply equipment 12. Thus, the energy input required by the natural gas plant 34 at the surface will be less and less as the fracking continues. The cycle of deeply-chilled meta-NG 50a being produced at the surface and returning as colder and colder return flow CNG 52 is repeated until the fracking results in freely flowing NG, which is accomplished without the need for a large-scale inflow of LNG to the site, and indeed without any liquids used for fracking, proppant delivery, or for mitigating the effects of such fracking liquids. After proppant delivery, the returning CNG stream 52 may carry some amount of proppant that did not stay trapped in the fissures. Those particles would be filtered out of the returning gas stream prior to transport to off-site customers. Such transport to off-site customers may be by pipeline or by LNG or CCNG tankers. ("CCNG" is the equivalent of meta-NG, above its critical pressure and colder than its critical temperature.) If off-site delivery is in a cryogenic form (LNG or CCNG), the on-site CCNG equipment 34 would continue to operate even beyond the fracking process.

As discussed above, where the meta-NG is pumped to 2,800 psia or greater pressure at a temperature range of approximately between $-170°$ F. to $-220°$ F., the pressure subsequently falls to about 500 psia, but the meta-NG forms some LNG within the fissures in the formation at conditions between approximately 500 psia at $-158°$ F. and 285 psia at $-197°$ F. That portion of the sent-down meta-NG that did not immediately form LNG upon pressure drop would return to the surface for recycling to meta-NG, followed subsequently by the portion that formed LNG, after that LNG vaporizes by the heat in the formation.

The meta-NG which liquefied into LNG when the pressure was released somewhat and fell below the critical pressure of natural gas (approximately 700 psia) will, as the slightly colder liquid phase of LNG, seep into crevices, whereupon warming (by the surrounding formation), or because of an increase in pressure from the pumping equipment above-ground, the LNG will re-form as a high-pressure (metacritical) vapor, further expanding the fissures. To the extent that LNG forms in any fissure, that fissure will propagate because the liquid will fill the smallest cracks and then increase the pressure at those points as the natural gas shifts in phase from liquid to gas, due to heat gain from the adjacent geology. This phenomenon allows adjustment of the pressures in the formation across the critical pressure of NG, thus "flexing" the formation and using the phase shift of the NG (from metacritical fluid to liquid and back) as another "tool" for extending or widening the fissures in the formation. In other words, VRGE can thermally shock the formation and cause fatigue cracks by allowing the NG in the formation to move back and forth across phases.

Where the pumped-to-pressure meta-NG is sent down to the geological formation at 2,800 psia or greater pressure and within a range of $-160°$ F. to $-200°$ F., it would lose only a portion of its pressure within the geological formation, falling to 700 psia or greater pressure and warming somewhat, having given up a portion of its refrigeration content to the "thermal shocking" of the geological formation. The returning 700 psia CNG would no longer be meta-NG (because it will be warmer than the critical temperature of methane), but at 700 psia it will be well-suited for re-cooling into meta-NG, without the need to compress that returning stream. In embodiments where NG is used as a refrigerant, the compressors 24 in the meta-NG plant 34 will only need to compress the methane that acts as the refrigerant meta-NG supply process, without needing to compress the "feed gas" that becomes meta-NG, thus further reducing the energy input needed to keep VRGE functioning.

As mentioned above, warm high-pressure CNG 50b could be sent down to the subterranean formation 18 via pipes 20a-20c with or without proppant. In this case, the refrigeration function of the surface-mounted meta-NG supply would be re-directed to produce high-pressure CNG 50b, (without excessive operating costs associated with ordinary compression) and allowing the equipment to send down warm high-pressure CNG 50b, shocking the previously chilled formation, warming it, and then allowing it to be shocked again when meta-NG 50a (produced by the same, now-redirected, refrigeration equipment) is sent down. More particularly, if thermal shocking of the subterranean formation 18 is deemed to be effective, a high-pressure warm CNG stream 50b would quickly follow a period of meta-NG 50a circulation, and those steps could be repeated any number of times.

The warm high-pressure CNG 50b would be circulated in the geological formation, raising the formation's temperature toward (and above) 600° F., followed rapidly by the insertion of meta-NG at approximately −200° F., which would yield a temperature delta of approximately 800° F. between the conditions in the formation and the meta-NG. These steps can be repeated any number of times. Once the subterranean formation 18 is sufficiently cold (frozen) from the meta-NG, a high-pressure warm CNG stream 50b can again be sent down 20c and 20d, causing significant thermal shock to the formation, which will result in fracturing, causing new fissures 19 to propagate. After the fracturing is deemed complete, pipe 20a would deliver proppant-loaded CNG 50c at a pressure suitable to drive the proppant 42 into the previously formed fissures 19. As the pressure is released, the proppant 42 will remain in the fissures, holding them open and allowing the previously trapped NG and other hydrocarbons (and any warm, high-pressure CNG 50b used by VRGE) to return to the surface in pipe 20e.

The warmed return-flow CNG 52 may be recycled by the natural gas plant 34 for re-refrigeration and compression, if needed, to become meta-NG 50a again. More particularly, the near-ambient high-pressure gas, now CNG 50b, is further warmed by recovered heat of compression that results in the meta-NG supply's 12 compression of the feed gas, raising the temperature of the warm high-pressure CNG 50b above 150° F. Further heating of the warm, high-pressure CNG 50b can be accomplished by waste heat recovered from the prime mover 22 of the meta-NG supply equipment 12 (an engine or gas turbine) or by the use of a NG-fired heater or other heat source. The meta-NG 50a produced and stored temporarily in a cryogenic buffer container, can be pumped to pressure, subjected to "cold recovery" (recovered from meta-NG before it is warmed), further heated to above about 600° F., and sent down to the subterranean formation, under pressure, to raise the temperature of the formation, prior to the thermal shocking of the formation by high-pressure, cold (about −200° F.) meta-NG.

The cold, pressurized meta-NG 50a in the subterranean formation 18 can be allowed to "pressure drop" (by releasing a valve at the surface), which may cause pockets of LNG formation. No methane emission will occur during that pressure drop, because the low-pressure NG would be returned to the compressor in the meta-NG supply equipment 12 for recompression and refrigeration, yielding meta-NG. The cold content of the meta-NG 50a may be recovered to allow that refrigeration to produce more meta-NG. The new meta-NG 50a is then sent down pipes 20b and 20c for a second pass through the subterranean formation 18 to repeat the cycle, which can be further repeated any number of times. With each such cycle, the subterranean formation 18 is thermally shocked, and the meta-NG 50a will travel further into the expanding fissures.

The cycle of cold send-down and warmer return can be repeated many times, with the only operating cost being the refrigeration produced by the meta-NG supply equipment 12. Those operating costs will be substantially lower than purchasing LNG from an off-site (usually distant) source and having that LNG delivered to the well site. More particularly, the vast majority of meta-NG produced can be used in the fracking process with a very small percentage used as fuel to run the meta-NG supply equipment 12. For example, of every hundred units of natural gas processed by the meta-NG supply equipment 12, about 80 to 95 units will be the meta-NG produced for the continued fracking and only about 5 to 20 units will be used as fuel to run the meta-NG supply equipment 12. As the fracking continues, the returning NG will be colder and colder with each cycle, allowing meta-NG supply equipment 12 to produce as much as 95 units of meta-NG for each 5 units of NG consumed as fuel to run the plant.

It is important to note that no liquid, even LNG, is sent directly into the well or into the subterranean formation in the disclosed systems and processes. Any moisture that may be found deep in the formation, near the horizontal pipe 20d, would freeze during the meta-NG send-down period, expanding as ice and helping to fracture the formation. Any such moisture or any methane hydrates in the formation would vaporize during the proppant delivery and would rise to the surface in pipe 20e, as a small portion of the return flow NG 52 arriving at the meta-NG supply equipment 12. In exemplary embodiments, that equipment may include dryers and $CO_2$ removal systems, such as molecular sieves. Heavier hydrocarbons, such as propane, ethane, butane and the like can be separated (by refrigeration) in the meta-NG supply equipment 12, and sent to market in liquid form, independently of the NG. It should also be noted that nothing other than the original NG used for fracking (and for proppant delivery) and the liberated hydrocarbons (whether NG, oil or condensates) returns to the surface.

That recovered/liberated NG stream 57 (and/or oil or condensate streams) is a valuable product recovered from embodiments of the fracturing processes and systems described herein, and, as such, is the major goal of VRGE. The NG's temperature and pressure can be calibrated to the mode by which it is taken from the VRGE deployment to market. For example, if the site were not near a NG pipeline, then NG stream 57 could be LNG (or meta-NG), suitable for transport in cryogenic vessels and delivered to such vessels via pipe 20g. However, if the well is close to a pipeline, then NG stream 57 can be NG at any appropriate pressure and temperature and would be delivered via pipe 20g. The colder the NG, the denser it will be at any given pressure, and that density is more sensitive to the temperature of the gas than to its pressure.

Once the subterranean formation 18 begins to release the formerly trapped NG, the on-site meta-NG supply equipment 12 can continue to provide a useful function. It can produce LNG (or meta-NG) from the recovered NG, allowing the recovered NG to be sent to market (in tanker trucks, trailers, rail cars or ships), even in the absence of a pipeline. If the well is located at or near a natural gas pipeline, the meta-NG supply equipment 12 can be used, beyond its fracking and proppant delivery role, to increase the density of the recovered NG stream by compressing and cooling it, thus allowing any given size pipeline to take away more natural gas. In other words, the equipment used for fracking and proppant delivery can be moved to a new well site to continue its fracking function or it can remain at its original location, enhancing the density of the recovered methane so that it can be taken to market more efficiently, while simultaneously increasing the capacity of the pipeline that carries it to market and also providing refrigeration that can be utilized to separate heavier hydrocarbons (propane, ethane, butane, etc.) from the NG stream.

Figure 3:
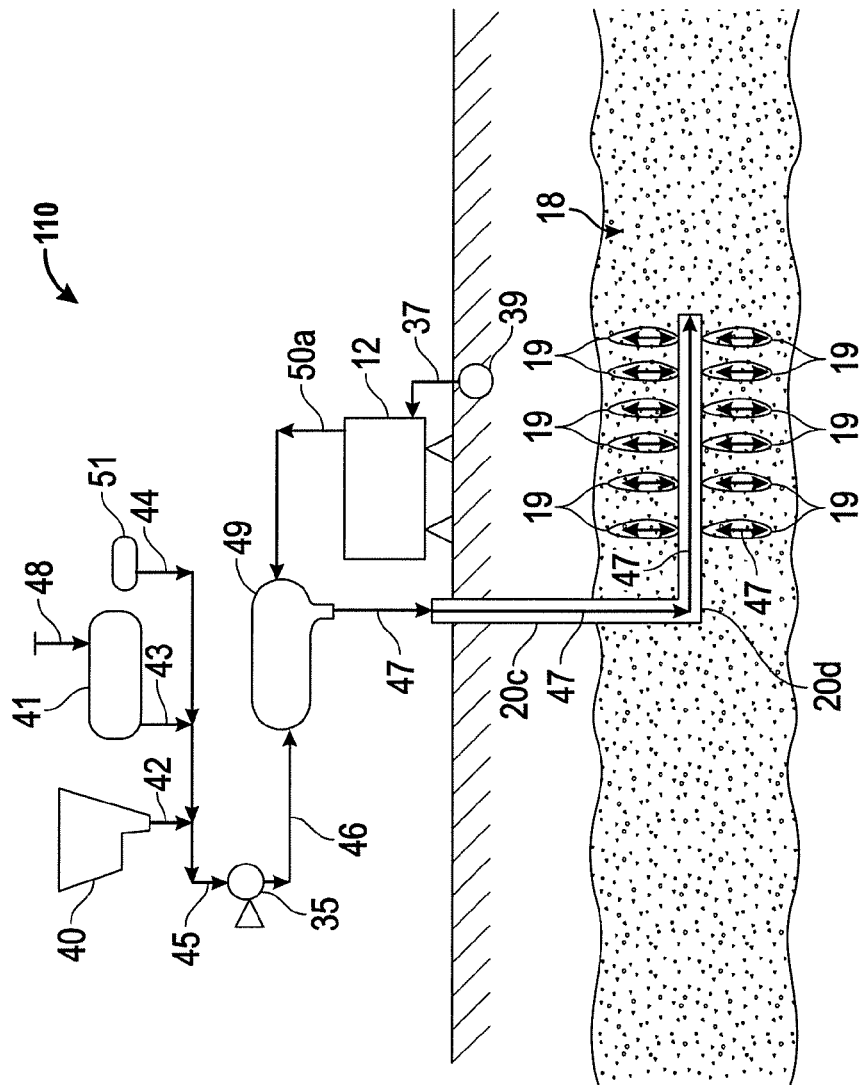
FIG. 3 is a box diagram of an embodiment of a proppant delivery system in accordance with the present disclosure.

Turning now to FIG. 3, exemplary embodiments of proppant delivery systems and methods will be described. FIG. 3 generally illustrates Cold Fracturing, where high-pressure, cold foam is used to fracture the hydrocarbon formation and to deliver proppant into the fractures. In Cold Fracturing, meta-NG may be produced at or near the well site and is used to foam a pumped to pressure mixture of non-aqueous liquid, including but not limited to methanol, ethanol, glycol, or other non-aqueous liquid (with zero or some minority amount of water), plus a surfactant, plus a proppant, such that a viscous, high-pressure, cryogenic proppant-carrying, foam is produced. The foam is delivered down the well bore to the formation to be fractured, creating longer and deeper fractures than warm hydraulic fracturing or warm foam fracturing, and delivering the proppant deeper into the fractures than other options. After some brief period, the foam collapses and the fractures close partially over the delivered proppant, such that the proppant allows the previously trapped hydrocarbons in the formation to flow to the surface at warm temperatures due to warming by the formation.

The collapsed foam's main components (NG and methanol) can travel back to the surface with the warm NG liberated from the formation, in some instances carrying water vapor. The returning warm NG, with its methanol and water vapor content is sent through a condensation system, with on-site meta-NG providing the necessary refrigeration, such that methanol (and water) are knocked out of the NG, and those recovered liquids can be reused for subsequent fracking stages or subsequent well completions. The delivery of cryogenic foam to the formation may be facilitated by an appropriately placed temporary liner or tubing that tolerates the cryogenic foam but protects the well casing. The liner/tubing may be removed after well completion and reused at the next well.

It should be noted that all the steps outlined above need not be undertaken at deeply chilled conditions. Rather, the present disclosure establishes a range of conditions that can yield substantial benefits when compared to standard hydraulic fracturing, or fracturing with warm, water-based foams, or with warm methanol. For example, the methanol foam may be produced at any temperature, using not only meta-NG (for cold foam), but also CNG for ambient temperature foam. When meta-NG is used to produce cold foam, the degree of refrigeration can be controlled. For example, one embodiment is to produce foam that is no colder than the tolerance of an unlined well casing, e.g., about 20° F., or possibly down toward negative (F) temperatures. Another determinant of foam temperature will be the balance sought between the desire for high-viscosity foam at the formation and free-flowing foam with less friction losses during its trip down the casing.

With reference to FIG. 3, proppant delivery system 110 includes proppant supply or hopper 40, non-aqueous liquid supply 41, foaming vessel 49, and natural gas supply 12, which may be meta-NG production equipment as described in more detail above. Surfactant supply 51 may be provided as well, and the various components of the proppant delivery supply system 110 are in fluid communication with each other via pipes and valves. The feed gas to NG supply 12 is shown as stream 37, derived from a nearby natural gas source 39, such as, but not limited to, a natural gas pipeline, or previously completed well that produces natural gas.

In exemplary embodiments, the non-aqueous liquid 43 is an alcohol, and particularly methanol. The selection of methanol (or any other equivalent alcohol including but not limited to ethanol or glycol) as the liquid used to produce the foam offers several benefits. First, unlike water, methanol does not swell the formation clays or cause other harm, and does not require chemical additives to mitigate the harm caused by water. By using methanol, the foam's viscosity can be adjusted without requiring chemical additives other than about 1% (by volume) of surfactant. Methanol is readily available in large quantities at costs that, while higher than water, are not excessive relative to its benefits.

Methanol is readily recoverable from the liberated hydrocarbons that flow to the surface after well completion, allowing most of the methanol used in the foaming of one stage of fracking to be re-used in the next stage or at the next well. Up to about to about 90% of the methanol used to produce the foam can be recycled, which serves to substantially reduce the "importing" of methanol to the well. Only make-up methanol need be delivered to the well on a regular basis, substantially reducing the costs of the liquid used to produce the foam. The methanol can be removed/recovered and recycled from the liberated NG by applying moderate-grade refrigeration to the methanol-containing NG stream (which returns to the surface warm), where the vaporized methanol will drop out as a liquid. That refrigeration is inherent and cost-effectively available in the meta-NG produced/used at the wellhead.

Any remaining methanol in the hydrocarbon that is sent to market is not a consequential contaminant. Methanol will not leave a residue on the fractured formation, as some other water-based fluids do, and which residue can clog the formation, restricting hydrocarbon flow. Methanol can also prevent corrosion in metal pipes, reduce fluid friction, thus lowering the fracturing fluid pumping pressure required, and improve the removal of formation water by reducing the capillary forces that inhibit the water from flowing into the well casing.

Returning to FIG. 3, the methanol stream 43 flows out of the non-aqueous liquid supply 41, and proppant 42 is added to it, forming non-aqueous liquid, surfactant and proppant stream 45 (without water or containing up to approximately 25% water). The proppant flow to stream 45 is controlled from a hopper 40, which is periodically refilled by proppant deliveries to the hopper. Surfactant stream 44 is supplied from surfactant supply 51, which may be a surfactant vessel (valves and make up point not shown). In exemplary embodiments, surfactant stream 44 is a very small fraction, e.g., less than about 2%, liquid volume of the other streams, although different proportions of surfactant may be used as needed.

The output of NG supply 12 is meta-NG stream 50a, which may be produced as described above. In exemplary embodiments, the purpose of meta-NG stream 50a is to "energize" a liquid (to produce foam 47) in foaming vessel 49 where meta-NG stream 50a is introduced to high-pressure methanol-surfactant-proppant stream 46. That high-pressure stream achieves its pressure by pump 35, which pumps methanol-proppant stream 45 to pressure. It should be noted that the proppant, liquid, and additives may be mixed together in a "blender" (not shown) that then delivers it to the pump 35. High pressure methanol-surfactant-proppant stream 46 and meta-NG stream 50a meet in foaming vessel 49 where the meta-NG 50a energizes the high pressure methanol-surfactant-proppant stream 46, thereby producing energized methanol-surfactant-proppant, or foam 47.

The foam 47 then flows through pipe 20c, is delivered to horizontal perforated pipe 20d, and on to fissures/fractures 19 in subterranean formation 18, extending and enhancing fractures and depositing proppant within those fractures. The methanol foam 47 will break after some period (e.g., about one hour) within the fractured formation, freeing the methanol from its foam-state to a liquid or vapor state depending on down-hole temperatures and pressures, which in turn depend on the depth of the formation. The methanol is soluble in hydrocarbons and will therefore dissolve in the recovered hydrocarbons to form proppant delivery liquid-hydrocarbon solution 3, discussed below with reference to FIG. 4.

Because meta-NG stream 50a is deeply refrigerated (as cold as about −150° F.), and even though high-pressure methanol-surfactant-proppant stream 46 is ambient, foam 47 will also be cold (e.g., as cold as about −100° F.), but not colder than the approximately −144° F. freezing point of methanol. The final temperature of foam 47 will be determined by the ratio of meta-NG stream 50a to high pressure methanol-surfactant-proppant stream 46 and the extent to which meta-NG stream 50a is entirely meta-NG or is blended with warmer CNG. Thus, the skilled operator of the fracturing process can easily select a wide range of possible foam temperatures from ambient down to about −144° F.

The ratio of methanol-surfactant-proppant stream 45 to meta-NG 50a could be adjusted by the skilled well-completion entity that would deploy the disclosed systems and methods. That ratio would likely range from a 60/40 to 25/75 (high-pressure methanol-surfactant-proppant stream 46 to meta-NG stream 50a), depending on the desired foam quality. The quality may be extended up to 90%. The skilled artisan will understand that the "quality" of the foam is the relationship of the gas to liquid ratio.

In exemplary embodiments, the desired temperature of the energized methanol-surfactant-proppant or foam 47 is within a range of about 0° F. to about −100° F. as it enters pipe 20c but somewhat warmer as it arrives at the fissures 19, due to heat gain from the surrounding geology between the surface equipment and the subterranean fissures to be fractured. One criterion among others for selecting the temperature of foam 47 concerns the configuration and materials used in the vertical piping 20c and/or the lining or tubing within 20c (not shown) that delivers foam 47 to the subterranean formation 18 by way of horizontal perforated pipe 20d. Another exemplary embodiment could provide pipe 20c extended in a vertical direction into the formation, rather than a horizontal direction, with pipe 20d being "under" pipe 20c. A second criterion could be the water content of the methanol. The less water the colder high-pressure methanol-surfactant-proppant stream 46 can be without freeze up.

The total volume of foam 47 can be as little as 50,000 gallon-equivalent per fracturing section to many times more than that, and may depend on the local formation characteristics and the capacity of the surface equipment, including pump 35 (as a single unit or grouped as several pumps) and the meta-NG production equipment 12 to produce a steady, high-volume stream of foam 47. The volume can be anything that the equipment can handle and is considered appropriate for the frac job.

The methanol or other non-aqueous liquid 43 in the non-aqueous liquid supply or buffer tank 41 may receive recycled methanol 48, as discussed below and illustrated in FIG. 4. That recycled methanol stream 48 may also receive make-up methanol (not shown) to offset any losses in the methanol delivery and recycle loop.

Figure 4:
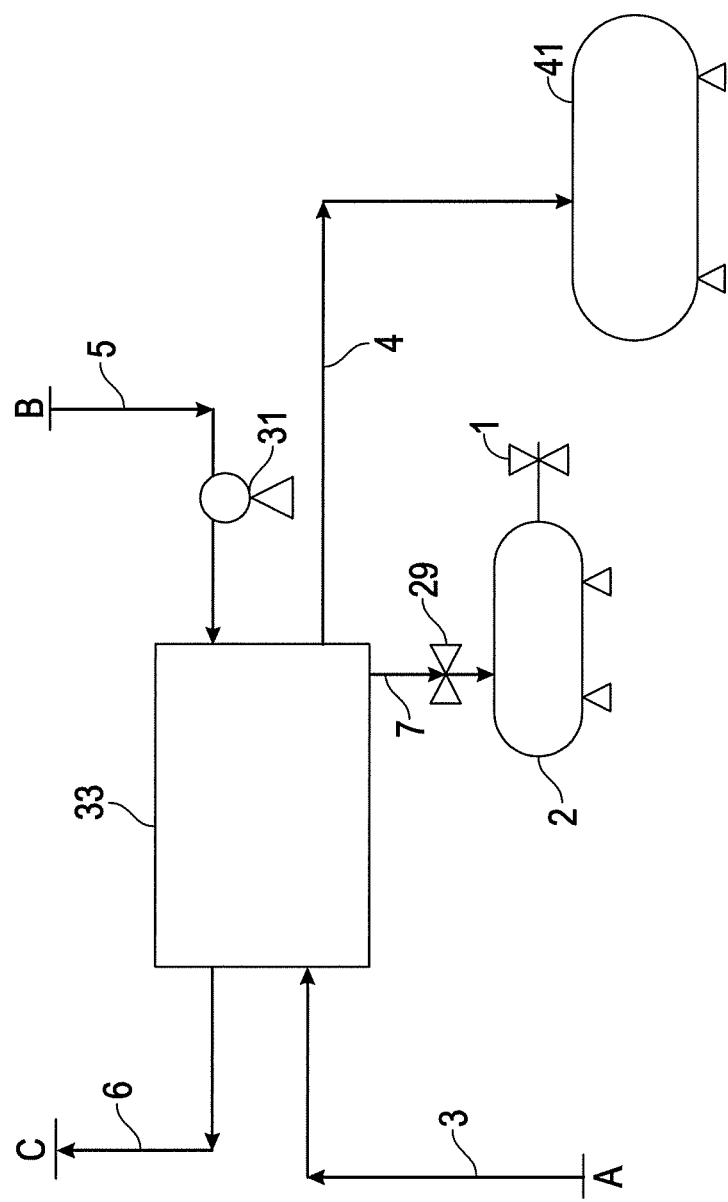
FIG. 4 is a box diagram of an embodiment of a proppant liquid recovery system in accordance with the present disclosure.

FIG. 4 is a schematic illustration of an exemplary embodiment of a method of recovering proppant delivery liquid. Point A represents an exit opening from the subterranean formation from which liberated NG, the solution of proppant delivery liquid dissolved in liberated hydrocarbon stream 3 that is rising from the completed well, carrying with it methanol vapor and some amount of water vapor, at a temperature that is dependent on the down-hole formation temperatures, which can range from about 100° F. to about 350° F. The liberated proppant delivery solution 3 enters heat exchanger 33, which is designed to allow condensates to form and to drip, by gravity, to a collection point(s) at the bottom of the heat exchanger 33.

Such heat exchangers are sometimes called reflux condensers, where the orientation, density and other aspects of the heat exchanger's internal surface arrangements are designed to enhance condensation, including by adjusting the flow rate of the stream out of which the condensates will be derived. Those familiar with condensing heat exchangers will be able to optimize the design of heat exchanger 33 to achieve the optimal condensation results. As in all such heat exchangers, the two fluids that move through heat exchanger 33 never mix, and are always on separate paths, separated by thin, heat-conducting surfaces.

Here, the proppant delivery liquid-hydrocarbon solution 3 flows in one direction through heat exchanger 33 while the counter-flowing meta-NG stream 5 enters from point B and flows in the opposite direction carrying refrigeration through heat exchanger 33, thereby condensing proppant delivery liquid-hydrocarbon stream 3. The purpose of meta-NG stream 5 is to deliver refrigeration to heat exchanger 33, condensing the methanol and water carried by proppant delivery liquid-hydrocarbon stream 3. Meta-NG stream 5 is pumped to a high pressure in a motor-driven cryogenic pump 31 (during which it warms one or two degrees), but remains in its metacritical state, above its critical pressure and colder than its critical temperature, as defined above. It should be noted that other methods for separating methanol from methanol and NG can also be applied. Such methods may include various types of phase separators. However, to the extent that such separation methods require refrigeration to condense the methanol at any point in the process, the available refrigeration content of meta-NG could still be used. In other words, an important aspect of VRGE, the on-site production of meta-NG, which is cold but may be warmed after pumping to pressure, is a widely advantageous step in the methanol recovery system.

It should also be noted that any moisture that returns with the methanol laden NG, (including water known as "formation water") may travel and condense with the methanol in the reflux condenser (or similar arrangement) outlined above. In that event the wet methanol liquid could undergo a second separation step where the methanol would be driven off from the water by heat, much like a distiller, and where the refrigeration content of meta-NG would condense the vaporized methanol. The heat source for the vaporization of the methanol could be the waste heat from the prime mover (gas turbine or gas engine) that drives the on-site VX Cycle (or equivalent) meta-NG production equipment.

Some amount of moisture in the methanol is tolerable and such wet methanol remains suitable as the liquid used (along with a surfactant) in producing the foam that delivers the proppant. For example, foam produced with wet methanol (water mixed with methanol), e.g., with about 75% methanol and about 25% water, will, in some formations, behave much like foam produced by 100% methanol, and not require any mitigating chemicals. The exact degree of wetness of the NG-energized foam, or the ratio of methanol to water in the liquid to be energized by the high-pressure NG, can vary depending on the geological conditions at the well. That ratio of methanol to water may be 75/25, or 80/20 or 90/10 depending on local formation conditions, and laboratory tests of the formation samples. Those skilled in the art will be able to set the wetness limit of the liquid methanol, balancing the higher cost of methanol against the lower cost of water (especially formation water vs. imported water) against the ability of that slightly wet methanol to produce a foam to function as a proppant delivery vehicle that does no harm to the formation and avoids the need for chemicals to mitigate the effects of water.

Returning to FIG. 4, outflow NG stream 4 is the NG that has given up its condensable content, where most of the methanol and any water carried in proppant delivery liquid-hydrocarbon stream 3 has left heat exchanger 33 as outflow methanol stream 7, and by way of a valve 29 entered a liquid storage tank 2, from which it can be released by another valve 1, and used to produce more foam, or be transported to the next well.

In the event that the water content of proppant delivery liquid-hydrocarbon stream 3 and outflow methanol stream 7 are higher than the amount of water that is desired in the methanol that is used to produce the foam, for example, because naturally occurring water in the formation ("formation water") is returning in vapor or liquid form with the NG, the liquids recovered in storage tank 2 can be further separated. The separation of methanol from water uses heat to boil-off the methanol from the water, followed by condensation of the methanol by a counter-flowing source of refrigeration.

Returning to FIG. 4, stream 4 is the NG stream that has very little methanol or water content and which can travel to non-aqueous liquid supply or buffer tank 41. Alternatively, it can be directed to an NG pipeline that takes the recovered NG to market, or can be directed to the VX Cycle (or equivalent) equipment that produces the meta-NG used in VRGE or to produce LNG that can be shipped to market.

Refrigerant outflow stream 6 is the somewhat warmed outflow (formerly meta-NG stream 5) from heat exchanger 33, leaving at point C. Depending on the flow rates set for proppant delivery liquid-hydrocarbon stream 3 and meta-NG stream 5, their respective temperatures and pressures, the outflow temperature for refrigerant outflow stream 6 will remain cryogenic, e.g., about −100° F., but below the critical temperature of NG, thus no longer metacritical. The cold, high-pressure refrigerant outflow stream 6, exiting at point C, can now be used to energize the methanol+surfactant+proppant mixture, producing the "fracking foam" described in connection with FIG. 3 that would be used to complete the next fracking stage.

In the event that the proppant delivery liquid recovery systems and methods are operating when the well is completed, and no further stages of fracturing are needed, refrigerant outflow stream 6 (after point C) can become a product stream, such as by further warming it (for example from the waste heat produced by the prime mover that runs the VX Cycle) and, after reaching ambient temperatures, and adjusting the stream's pressure, depositing that NG stream into a nearby NG pipeline. Alternatively, the cold and high-pressure refrigerant outflow stream 6 can exit the system at point C and be returned to the VX Cycle (or equivalent) plant for liquefaction into LNG, so that it can be transported to market outside of NG pipelines.

In other words, the outflow from point C is "pipeline quality" because it was derived from the VX Cycle (or equivalent) equipment, which removed any moisture and $CO_2$ content. The outflow NG stream 4, with the moisture and methanol content of proppant delivery liquid-hydrocarbon stream 3 having been substantially removed, may be pipeline quality, if the formation from which proppant delivery liquid-hydrocarbon stream 3 is derived is producing pipeline quality gas. However, in some instances outflow NG stream 4, after leaving the system, may require further treatment, for example, to remove any heavier hydrocarbon liquids carried by proppant delivery liquid-hydrocarbon stream 3 and remaining in outflow NG stream 4. The temperature and pressure conditions at which the heat exchanger 33 will operate can be adjusted to remove methanol and water, leaving any heavier hydrocarbons in outflow NG stream 4, where those hydrocarbons can be removed by one of several well-understood methods that are outside the scope of this invention.

The choice of meta-NG vs. CNG for foaming will depend on the desire to produce foam that is more viscous with the colder meta-NG or less viscous with CNG. Foam viscosity is one of many factors that well-completion experts control in order to achieve deep proppant delivery inside the fracture. The viscosity of foams, including the use of methanol foam produced with meta-NG as the gas source, is substantially higher than ambient temperature foams. Higher viscosity foams will perform better than lower viscosity foams. More particularly, higher viscosity helps create wider fractures and helps carry the proppant deeper inside the fractures. Thus, one embodiment is to calibrate the temperature of the foam to colder than ambient, and preferably colder than about 32° F., and most preferably colder than −20° F., achieving viscosities that are not possible with standard fluids at ambient temperature (except with special additives), but where that selected temperature range is within the tolerances of the piping (and casing) that delivers the foam to the formation to be fractured.

If the foam is sent down the well bore at, e.g., about −20° F., it will arrive warmer at the formation to be fractured, because the piping and the surrounding geology will warm the foam, as will the friction with the piping. Still, depending on the depth of the hydrocarbon-bearing formation, and the temperatures at those depths, the cold foam will arrive significantly colder at the formation than if it were sent down at a starting temperature that is at ambient, arriving hotter at the formation. In other words, the refrigerated foam will arrive colder (and more viscous) in the formation than fluids or foams produced at ambient temperatures.

In exemplary embodiments, the meta-NG-produced foam would be nearly as cold as the meta-NG (e.g., about −150° F.), as long as the temperature of the foam does not approach the freezing temperature of the liquids used (about −140° F.) and as long as the foam is not excessively viscous, and as long as the piping that carries the foam to the formation can tolerate those temperatures without cracking and without shrinking so much as to cause gaps in the piping. Such deeply chilled foam can have several other positive effects. First, it can deliver thermal shock to the formation, allowing for fracturing with less pressure. Secondly it may cause some of the formation water to freeze, expand and thus enhance the fracturing effort.

Third, to the extent that the geology around the well bore freezes, it may add extra stability around the casing.

For the above and other reasons, an exemplary embodiment is to send down the coldest possible foam that can be tolerated by the piping and casing system and is still within the desired viscosity limits. To that end, there are several approaches that can be selected, including (but not limited to) the following. Within a standard casing, deliver the cryogenic foam within suspended tubing, where spacers separate the cryogenic-tolerant tubing from the well bore casing, allowing the annular space between the tubing and the casing to form an insulation barrier between the two. Such tubing may be of 9% nickel steel or other suitable material (including high-density polyethylene [HDPE] piping), with expandable (contracting) connections, similar to "bellows," which would allow the tubing to contract and expand without leakage. The tubing would be temporary, in place only during the multiple fracturing stages, and would be removed after the completion of the well and before the hydrocarbon stream is at production levels. In that way, the tubing could be reused at the next well.

A variation of the option above, but where the cryogenic-tolerant liner is a wider diameter than tubing, allowing the liner to be installed within the casing, but with a rigid foam liner between the two. As above, the liner would be removed after the completion of the well and reused at the next well. Another variation of the above is the use of cryogenic "braided hose" that is inserted in, e.g., 50' interconnected sections, from the surface to the perforated piping through which the cryogenic foam would be delivered. Such stainless steel braided hoses are routinely used to transfer cryogenic liquids such as LNG and liquid oxygen. The substantial cost of this option will likely be mitigated by the "quick connect" joints between sections of hose, the ease of installation and removal and the ability to reuse the hose sections many, many times.

As mentioned above, disclosed non-hydraulic fracturing systems and methods using meta-NG to promulgate new fissures and expand existing ones will not result in any methane release to the atmosphere, because the fracturing process described here requires tight seals between the surface equipment and the underground formation in order to be effective and because the present invention does not use water for fracturing, thus eliminating the return to the surface of such water into which hydrocarbons have been dissolved. This is true even in the context of deep underground hydrocarbon formations containing large amounts of hydrocarbons (including methane), which have been contained for millennia by the overburden. Rather, the cryogenic methane that fractures the hydrocarbon-bearing formation 18 will allow the trapped methane (along with any methane used in the fracking) to rise to the surface-mounted equipment through the network of pipes 20, under controlled conditions, where it will be re-refrigerated by the meta-NG supply equipment 12 and/or inserted into an adjacent pipeline (or an LNG tanker truck, ship, or other LNG vessel) that will transport the methane to customers.

Disclosed non-hydraulic fracturing systems and processes can be deployed at wells with nearby pipeline access, allowing the flowing NG to be delivered to market in the standard way. Alternatively, at locations too far from pipelines, VRGE allows for the on-site liquefaction (or meta-NG production) of the liberated methane, thus allowing wells at such locations to get the recovered product to market in tanker trucks/trailers or ships, even in the absence of a pipeline. Where the NG is delivered by pipeline, VRGE will allow higher quantities of methane to be delivered, because meta-NG (and even moderately cold NG) has far greater density than standard NG, thus increasing the capacity of such pipelines. A given diameter pipeline will carry more product (in lbs and BTUs) if that product is denser.

Disclosed embodiments of VRGE are also suitable for "pipeline quality" gas fields and for gas that has higher concentrations of $CO_2$, water, $N_2$ or heavy hydrocarbons, because VRGE can include any degree of clean-up required to remove the non-methane components from the recovered NG. (Hydraulic fracturing by water or $LN_2$ does not provide for that option.) Many of the techniques used to "knock out" $CO_2$, water, $N_2$ and heavy hydrocarbons involve the use of refrigeration. VRGE, using the meta-NG production system at the surface, can allocate a portion of its refrigeration capacity (and low-grade "waste" refrigeration output) to those knock-out processes. Indeed, the heavy hydrocarbons (often referred to as natural gas liquids ("NGLs"), and which include propane, butane, isobutane, pentane and ethane) often found in NG streams have substantial market value (sometimes greater than the value of the methane obtained from the same NG stream), and the use of the refrigeration inherent in VRGE to separate these heavy hydrocarbons for sale to the market would be part of exemplary embodiments of VRGE.

For hydrocarbon-bearing formations located beyond the reach of cost-effective connections to existing NG pipelines, located where nearby pipelines have limited capacity, or located where the price of NG is relatively low compared to the price of the product at the end-user, the optimal solution for recovered methane is to liquefy it and to send it to market in LNG tanker trucks (or ship), outside of the pipeline system, as a "value added" product. Disclosed embodiments allow the same meta-NG plant that produces the fracking fluid to also be the LNG/meta-NG production facility that allows for the recovered methane to be converted to LNG or CCNG and brought to market outside of the natural gas pipeline network (via tanker truck or ship).

It also should be understood that disclosed non-hydraulic fracturing systems and methods can be adapted for use in tight geological formations that contain oil and/or condensates. Such deployments would have different sets of protocols as to when to use meta-NG (for fracking), when to send down the proppant and at what temperature, and when to use warm CNG to induce the flow of oil and/or condensates. The liquid hydrocarbons that would arrive at the surface would include "associated" NG suspended in the liquid, which would be allowed to "boil off" the liquid and thus be separated from it. The output from such a deployment would include crude oil and/or condensates in liquid form and NG that can be chilled to meta-NG or LNG.

When applied to formations that contain more oil than natural gas, embodiments of VRGE would be used with alternating downward meta-NG flow and warm CNG flow, thermally shocking the formation, and delivering pressure, but with the final step being a warm CNG flow to induce the flow of the liquid hydrocarbons (e.g., oil) formerly trapped in the formation. The rising oil would contain some amount of CNG, which would be separated by well-known means (such as well site heater treaters), with the recovered methane and other gaseous hydrocarbons used to fuel the equipment, or sent off-site as NG/LNG/meta-NG/LPG/NGLs to markets seeking those products, including gas processing plants.

Thus, it is seen that non-hydraulic fracturing systems, methods and processes are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A method of delivering a proppant via foam, comprising:
   providing a non-aqueous liquid;
   adding a surfactant to the non-aqueous liquid;
   adding a proppant to the non-aqueous liquid to form a non-aqueous liquid, surfactant and proppant stream;
   pumping to pressure the non-aqueous liquid, surfactant and proppant stream;
   producing pressurized natural gas such that it reaches a pressure of about 700 psia and a temperature below about −150° F.;
   pumping to pressure the pressurized natural gas to further increase its pressure from about 700 psia to a higher pressure;
   using the higher pressure pressurized natural gas to energize the non-aqueous liquid, surfactant and proppant stream;
   delivering the energized non-aqueous liquid, surfactant and proppant stream into a subterranean formation.

2. The method of claim 1 wherein the pressurized natural gas is metacritical phase natural gas having a pressure above about 700 psia.

3. The method of claim 1 wherein the non-aqueous liquid is an alcohol.

4. The method of claim 3 wherein the alcohol is methanol.

5. The method of claim 4 wherein the methanol, surfactant and proppant stream enters a foam state when it is energized by high-pressure natural gas.

6. The method of claim 5 wherein the foam state of the methanol breaks in the subterranean formation such that the methanol becomes liquid or vapor; and
   the liquid or vapor methanol dissolves in a hydrocarbon liberated from the subterranean formation forming a methanol-hydrocarbon solution and the methanol-hydrocarbon solution travels out of the subterranean formation.

7. The method of claim 6 further comprising recovering the methanol by:
   directing metacritical phase natural gas in a first direction, the metacritical phase natural gas having a temperature below about −150° F. and a pressure above about 700 psia; and
   directing the methanol-hydrocarbon solution in a second direction substantially opposite to the first direction such that the metacritical phase natural gas cools the methanol-hydrocarbon solution and such that the methanol in the methanol-hydrocarbon solution condenses out of solution.

8. The method of claim 1 wherein the energized non-aqueous liquid, surfactant and proppant stream is at a temperature between ambient temperature and about −150° F.

9. The method of claim 1 wherein the pressurized natural gas is compressed natural gas.

10. The method of claim 1 wherein the pressurized natural gas is produced at the site of the subterranean formation.

11. The method of claim 1 further comprising reprocessing natural gas returning from the subterranean formation such that it forms new pressurized natural gas.

12. The method of claim 1 further comprising reprocessing natural gas returning from the subterranean formation including cleaning the natural gas returning from the subterranean formation to separate natural gas liquids or remove non-methane components from the natural gas.

13. The method of claim 1 further comprising controlling viscosity of the non-aqueous liquid, surfactant and proppant stream by calibrating temperature of the non-aqueous liquid, surfactant and proppant stream and using metacritical phase natural gas for higher viscosity or using compressed natural gas for lower viscosity, the metacritical phase natural gas having a temperature below about −150° F. and a pressure above about 700 psia.

14. A method of recovering proppant delivery liquid, comprising:
   recovering a solution of proppant delivery liquid dissolved in a hydrocarbon liberated from a subterranean formation when the solution travels out of the subterranean formation;
   directing metacritical phase natural gas in a first direction, the metacritical phase natural gas having a temperature below about −150° F. and a pressure above about 700 psia; and
   directing the proppant delivery liquid-hydrocarbon solution in a second direction substantially opposite to the first direction such that the metacritical phase natural gas cools the proppant delivery liquid-hydrocarbon solution and such that the proppant delivery liquid in the proppant delivery liquid-hydrocarbon solution condenses out of solution.

15. The method of claim 14 wherein the metacritical phase natural gas is produced at the site of the subterranean formation.

16. A proppant delivery system comprising:
   a proppant supply;
   a surfactant supply fluidly connected to the proppant supply;
   a non-aqueous liquid supply fluidly connected to the proppant supply and the surfactant supply;
   a foaming vessel fluidly connected to the proppant supply, the surfactant supply and the non-aqueous liquid supply;
   a natural gas supply fluidly connected to the foaming vessel, the natural gas being pressurized such that it reaches a pressure of above about 700 psia and a temperature below about −150° F.;
   at least one positive displacement device fluidly connected to the foaming vessel, the positive displacement device pumping to pressure the pressurized natural gas to further increase its pressure; and
   a network of pipes fluidly connected to the at least one positive displacement device with at least one pipe extending into a subterranean formation.

17. The system of claim 16 wherein a proppant from the proppant supply and a surfactant from the surfactant supply are added to a non-aqueous liquid from the non-aqueous liquid supply to form a non-aqueous liquid, surfactant and proppant stream and the positive displacement device pumps to pressure the non-aqueous liquid, surfactant and proppant stream.

18. The system of claim 17 wherein pressurized natural gas foams the non-aqueous liquid, surfactant and proppant stream.

19. The system of claim 18 wherein the found non-aqueous liquid, surfactant and proppant stream flows through the network of pipes into the subterranean formation such that the energized non-aqueous liquid, surfactant and proppant stream holds open one or more fissures in the subterranean formation.

20. The system of claim 16 wherein the non-aqueous liquid is methanol.

21. A method of delivering a proppant via foam, comprising:

providing a non-aqueous liquid;
adding a surfactant to the non-aqueous liquid;
adding a proppant to the non-aqueous liquid to form a non-aqueous liquid, surfactant and proppant stream;
pumping to pressure the non-aqueous liquid, surfactant and proppant stream;
using pressurized natural gas to energize the non-aqueous liquid, surfactant and proppant stream;
delivering the energized non-aqueous liquid, surfactant and proppant stream into a subterranean formation; and
controlling viscosity of the non-aqueous liquid, surfactant and proppant stream by calibrating temperature of the non-aqueous liquid, surfactant and proppant stream and using metacritical phase natural gas for higher viscosity, the metacritical phase natural gas having a temperature below about −150° F. and a pressure above about 700 psia.

* * * * *